US010019207B2

(12) United States Patent
Kitagawa et al.

(10) Patent No.: US 10,019,207 B2
(45) Date of Patent: Jul. 10, 2018

(54) INFORMATION PROCESSING APPARATUS, METHOD OF CONTROLLING THE SAME, AND NON-TRANSITORY COMPUTER-READABLE MEDIUM CONFIGURED TO GENERATE A CONTROL JOB FOR OCCUPYING COMMUNICATION WITH A PERIPHERAL DEVICE

(71) Applicant: CANON KABUSHIKI KAISHA, Tokyo (JP)

(72) Inventors: Kan Kitagawa, Odawara (JP); Toshinori Kawaura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/422,043

(22) Filed: Feb. 1, 2017

(65) Prior Publication Data

US 2017/0242639 A1 Aug. 24, 2017

(30) Foreign Application Priority Data

Feb. 22, 2016 (JP) .................................. 2016-031462

(51) Int. Cl.
*G06F 15/00* (2006.01)
*G06F 3/12* (2006.01)
*G06K 1/00* (2006.01)

(52) U.S. Cl.
CPC .......... *G06F 3/1254* (2013.01); *G06F 3/1205* (2013.01); *G06F 3/125* (2013.01); *G06F 3/126* (2013.01); *G06F 3/1225* (2013.01); *G06F 3/1236* (2013.01); *G06F 3/1284* (2013.01)

(58) Field of Classification Search
CPC .... G06F 3/1254; G06F 3/1205; G06F 3/1225; G06F 3/1236; G06F 3/125; G06F 3/126; G06F 3/1284
USPC ................................ 358/1.15, 1.13, 1.14, 1.1
See application file for complete search history.

(56) References Cited

U.S. PATENT DOCUMENTS

| 9,007,641 B2* | 4/2015 | Morimoto | G06F 3/121 358/1.15 |
|---|---|---|---|
| 9,069,508 B2 | 6/2015 | Kawaura | |
| 2013/0067120 A1 | 3/2013 | Forrest, III et al. | |
| 2016/0253138 A1* | 9/2016 | Kawaura | G06F 3/1239 358/1.14 |
| 2017/0060488 A1* | 3/2017 | Oya | G06F 9/4411 |

* cited by examiner

*Primary Examiner* — Douglas Tran
(74) *Attorney, Agent, or Firm* — Fitzpatrick, Cella, Harper & Scinto

(57) ABSTRACT

An information processing apparatus capable of operating an application. The apparatus includes a generation unit configured to generate a control job for occupying communication with a peripheral device, wherein the control job is stored in a job queue, and is different from a print job that is stored in the job queue due to require print processing and a deletion unit configured to delete the control job stored in the job queue. If a status of the control job stored in the job queue is processing, communication with the peripheral device via a communication unit is occupied by an application that has created the control job, and, after communication for the application is completed, the deletion unit deletes the control job stored in the job queue.

20 Claims, 11 Drawing Sheets

FIG. 5

```xml
<?xml version='1.0'?>
<bidi:Schema xmlns:bidi="http://schemas.microsoft.com/windows/2010/09/printing/usbbidi">
  <Property name="Printer">
    <Property name="Extension">
      <Value name="SetData" type="BIDI_STRING" accessType="Set"/>
      <Value name="GetData" type="BIDI_STRING" accessType="Get"/>
      <Value name="SendPrintData" type="BIDI_STRING" accessType="Set"/>
    </Property>
  </Property>
</bidi:Schema>
```

FIG. 6A

```
<!--Media List Request Command-->
<command targetdevice="printer">
    <action type="datarequest">
        <data id="1">MediaList</data>
    </action>
</command>
```

FIG. 6B

```
<!--Printer Status Request Command-->
<command targetdevice="printer">
    <action type="datarequest">
        <data id="1">StatusInformation</data>
    </action>
</command>
```

FIG. 6C

```
<!--Set Media Information Command-->
<command targetdevice="printer">
    <action type="dataadapt">
        <data type="media">
            <id>00000001</id>
            <name>plain paper</name>
            <param><![CDATA[drawing parameter]]></param>
        </data>
    </action>
```

FIG. 6D

```
<!--Media List Response Command >
<command response="printer">
    <mediatypelist>
        <media id="1">
            <id>00000001</id>
            <name>plain paper</name>
            <param><![CDATA[drawing parameter]]></param>
        </media>
        ...
        <media id="n">
        ...
        </media>
    </mediatypelist>
</command>
```

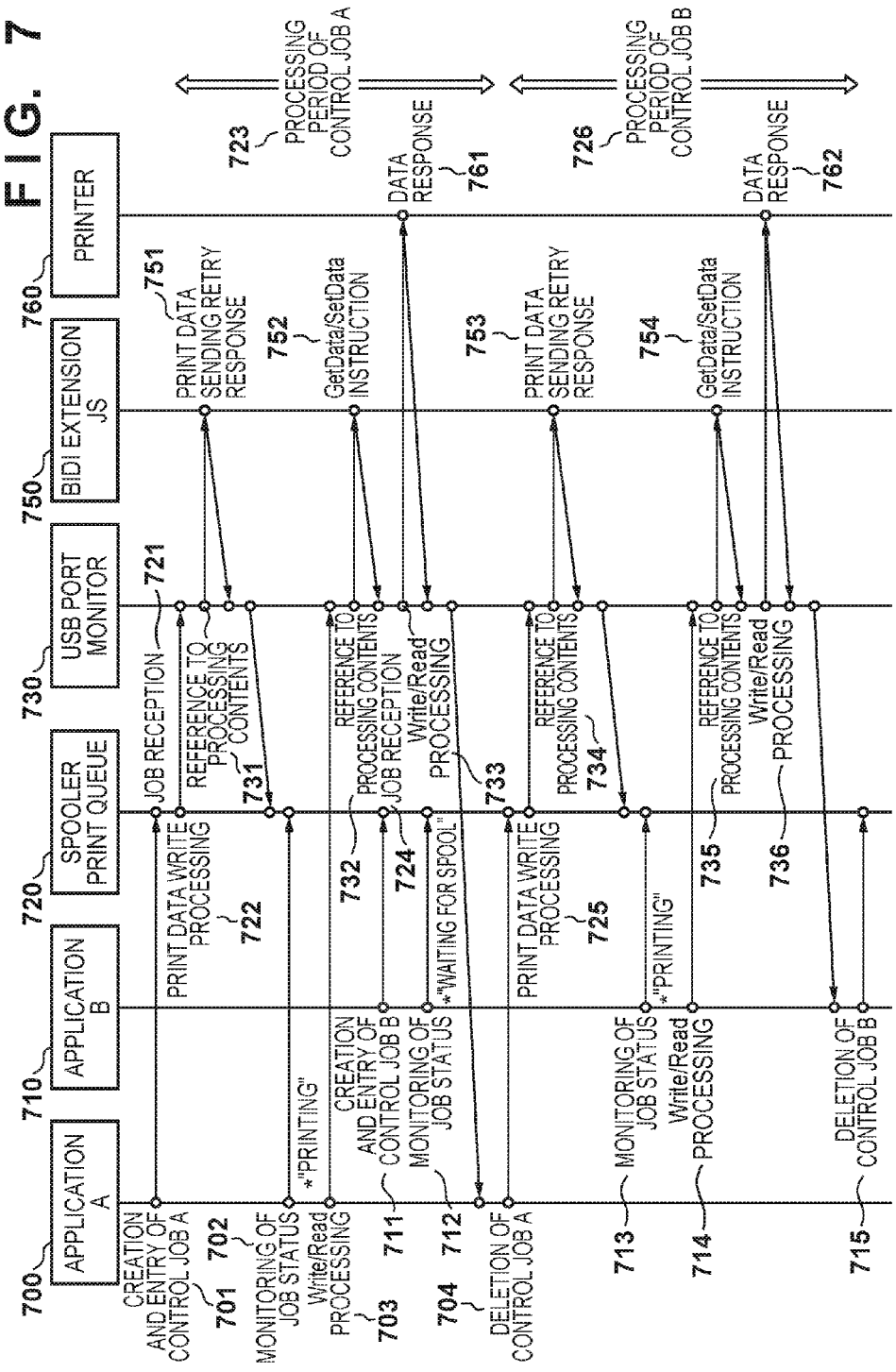

F I G. 9

| Print Queue | |
|---|---|
| Document Name | Status |
| Contol_7017D7E5-B2CB... (901) (902) | Printing (903) |

900

INFORMATION PROCESSING APPARATUS, METHOD OF CONTROLLING THE SAME, AND NON-TRANSITORY COMPUTER-READABLE MEDIUM CONFIGURED TO GENERATE A CONTROL JOB FOR OCCUPYING COMMUNICATION WITH A PERIPHERAL DEVICE

BACKGROUND OF THE INVENTION

Field of the Invention

The present invention relates to an information processing apparatus, a method of controlling the same, and a non-transitory computer-readable medium.

Description of the Related Art

In a Windows® environment, in a conventional printer driver (v3 printer driver) architecture, a vendor could provide a bidirectional control module called a language monitor. The language monitor could control sending/receiving of a print job, and also an information write and obtainment request from various applications to a printer.

Recently, a standard information sending/receiving method using a Bidirectional (Bidi) schema by a next-generation printer driver (v4 printer driver) architecture has been developed. The language monitor does not exist in this next-generation v4 printer driver architecture, making it difficult to perform free information sending/receiving control. U.S. Patent Application Publication No. 2013/0067120 describes a standard information sending/receiving method using a Bidi schema. In particular, U.S. Patent Application Publication No. 2013/0067120 discloses a technique of reading out, by a port monitor of an OS (Operating System), an externally dependent file called a Bidi extension file bundled with a printer driver or a Bidi extension JavaScript (Bidi extension JS) file. In this externally dependent file, a unique information sending/receiving specification for each printer vendor which creates the printer driver is implemented.

In U.S. Patent Application Publication No. 2013/0067120, however, a problem that while one software performs information sending/receiving processing by using the Bidi schema, the other software interrupts information sending/receiving by using the Bidi schema is not considered. As a result, for example, information that should be obtained by the one software may be sent to the other software, and user-intended processing may not be performed.

SUMMARY OF THE INVENTION

In order to solve such a problem, the present invention provides exclusive control that can coexist with an OS standard technique.

According to one aspect, the present invention provides an information processing apparatus capable of operating an application, the application including a generation unit configured to generate a control job for occupying communication with a peripheral device and enter the generated control job in a job queue, and a deletion unit configured to delete the control job entered in the job queue, wherein if a status of the control job entered in the job queue is processing, communication with the peripheral device via a communication unit is occupied by the application that has created the control job, and after communication for the application is completed, the deletion unit deletes the control job entered in the job queue.

According to another aspect, the present invention provides a method of controlling an information processing apparatus capable of operating an application, the method comprising, in the application, generating of generating a control job for occupying communication with a peripheral device and entering the generated control job in a job queue, and deleting the control job entered in the job queue, wherein if a status of the control job entered in the job queue is processing, communication with the peripheral device via a communication unit is occupied by the application that has created the control job, and after communication for the application is completed, the control job entered in the job queue is deleted.

According to another aspect, the present invention provides a non-transitory computer-readable medium storing a program that causes a computer to function as a generation unit configured to generate a control job for occupying communication with a peripheral device and enter the generated control job in a job queue, and a deletion unit configured to delete the control job entered in the job queue, wherein if a status of the control job entered in the job queue is processing, communication with the peripheral device via a communication unit is occupied by an application that has created the control job, and after communication for the program is completed, the deletion unit deletes the control job entered in the job queue.

According to the present invention, it becomes possible to provide exclusive control that can coexist with the OS standard technique and perform user-intended processing.

Further features of the present invention will become apparent from the following description of exemplary embodiments (with reference to the attached drawings).

BRIEF DESCRIPTION OF THE DRAWINGS

FIG. 5 is a view showing an example of the description of a Bidi extension schema definition file;

FIGS. 6A, 6B, 6C, and 6D are views showing examples of the descriptions of various commands;

FIG. 7 is a sequence chart showing an overall processing sequence according to the first embodiment;

FIG. 9 is a view showing the GUI of a print queue.

DESCRIPTION OF THE EMBODIMENTS

Preferred embodiments of the present invention will be described below in detail with reference to the accompanying drawings. Note that the following embodiments do not limit the present invention related to the scope of the claims, and all of combinations of characteristic features described in the embodiments are not indispensable for solution of the present invention.

First Embodiment

[Apparatus Arrangement]

Figure 1:
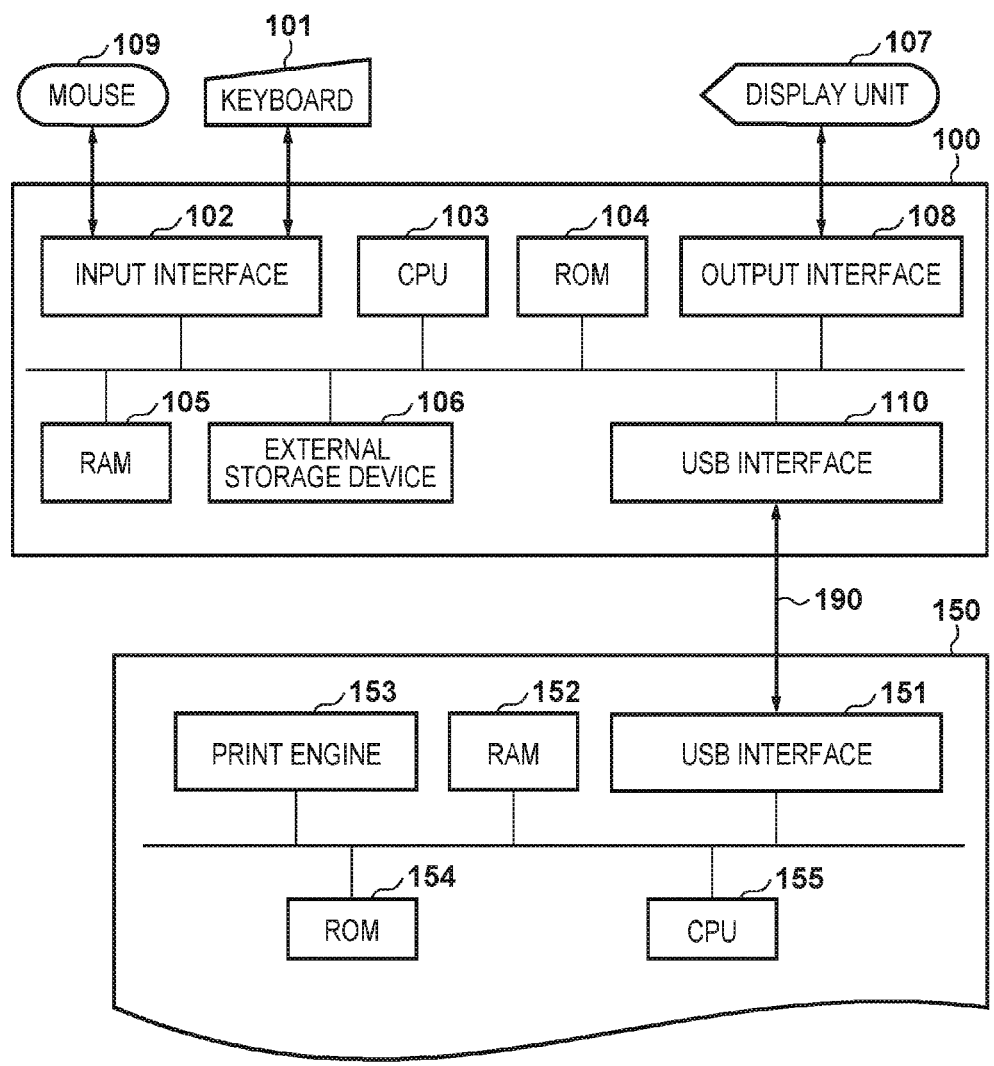
FIG. 1 is a block diagram showing an example of the hardware arrangement of a printer and an information processing apparatus.

An example of the hardware arrangement of a printer and an information processing apparatus according to this embodiment will be described with reference to FIG. 1.

An information processing apparatus 100 includes an input interface 102, a CPU 103, a ROM 104, a RAM 105, an external storage device 106, an output interface 108, and a USB interface 110. The information processing apparatus 100 can communicate with a printer 150 via the USB interface 110 and a USB cable 190. The ROM 104 stores an initialization program. The external storage device 106 saves an application program group, an OS, a printer driver, and various other data. Various programs stored in the external storage device 106 use the RAM 105 as a work memory. The input interface 102 is connected to a keyboard 101 and a mouse 109, and receives a user input through them. The output interface 108 is connected to a display unit 107 and sends/receives various data to be displayed on the display unit 107.

The printer 150 includes a USB interface 151, a RAM 152, a print engine 153, a ROM 154, and a CPU 155. The printer 150 can communicate with the information processing apparatus 100 via the USB interface 151 and the USB cable 190. The RAM 152 is used as the main memory or the work memory of the CPU 155, and saves various data and a reception buffer configured to temporarily save received print data. The print engine 153 performs printing based on the data saved in the RAM 152. A processing share between the information processing apparatus 100 and the printer 150 has been described above as an example here. However, the processing share is not particularly limited to this form but may be another form.

Figure 2:
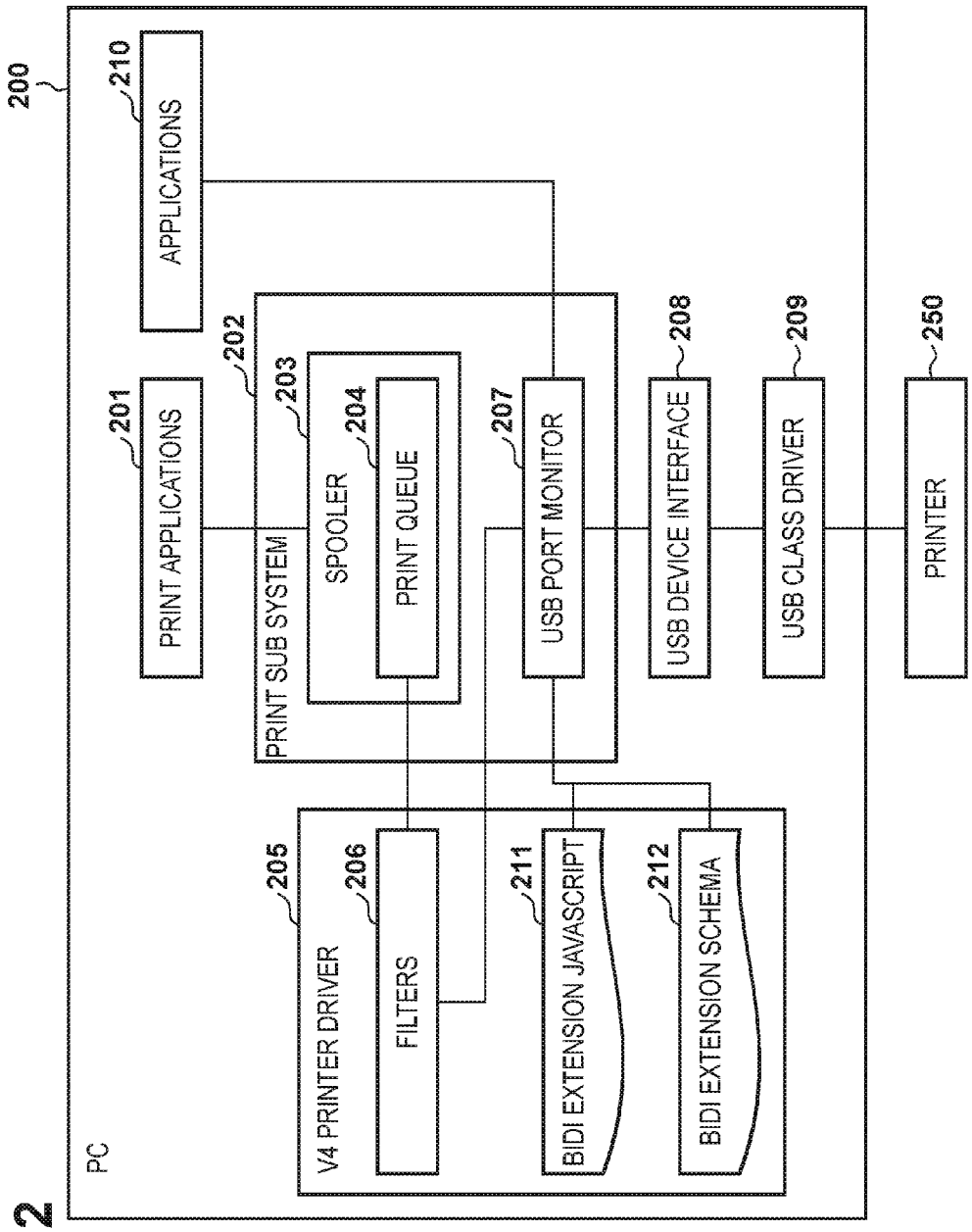
FIG. 2 is a block diagram showing an example of the arrangement of a printer driver and an OS print sub system.

FIG. 2 is a block diagram showing an example of the arrangement of an OS print sub system and a printer driver included in a PC 200. The PC 200 can communicate with a printer 250 via a USB cable. Note that the PC 200 corresponds to the information processing apparatus 100 of FIG. 1, and the printer 250 corresponds to the printer 150 of FIG. 1.

First, a data sequence until print data is passed from the PC 200 to the printer 250 will be described with reference to FIG. 2. Each print application 201 utilizes an API (Application Program Interface) which inputs a print instruction provided by the OS and makes a print processing request for the OS. One or the plurality of print applications 201 can operate in the PC 200 according to this embodiment. Print jobs issued based on the print processing request are processed in a spooler 203 of a print sub system 202 in the OS. The spooler 203 stores the print jobs issued from the print applications 201 in a print queue 204 serving as a job queue. The spooler 203 stores, in the print queue 204, the plurality of print jobs from the plurality of print applications 201 in the PC 200. The spooler 203 sequentially sends the print jobs stored in the print queue 204 to a v4 printer driver 205 (to be simply referred to as a "printer driver" hereinafter). Note that processing in which the spooler 203 sends the print jobs to the printer driver 205 will be referred to as despool processing. Upon receiving the print jobs, the printer driver 205 uses filters 206 to perform page arrangement processing and command generation processing, and generates print data that can be interpreted by the printer 250.

Page arrangement processing here refers to processing of rearranging the order of pages based on print setting information instructed from the print applications 201 and processing for arranging a plurality of pages on a physical page corresponding to one side of a paper sheet. Command generation processing refers to processing of converting the print jobs into print data that can be interpreted by the printer 250. When the filters 206 finish processing of converting the print jobs into the print data, the printer driver 205 passes the print data to a USB port monitor 207 in the print sub system 202. Subsequently, the USB port monitor 207 transfers the print data to the printer 250 via a USB device interface 208 and a USB class driver 209.

Data movement made by applications 210 in the PC 200 by, without using any print job, writing (sending) information in the printer 250 or reading out the information from the printer 250 will now be described with reference to FIG. 2. Note that one or the plurality of applications 210 can operate in the PC 200 according to this embodiment. The applications 210 utilize the API (Bidi interface) provided by the OS to access the printer 250. The Bidi interface is an interface for the OS and the applications 210 to perform bidirectional communication via setting information constituted by an XML (Extensible Markup Language) called a Bidi schema. The USB port monitor 207 in the OS receives, from the applications 210, the Bidi schema via the Bidi interface. Then, the USB port monitor 207 specifies the function of a Bidi extension JS 211 of the printer driver 205 following a Bidi extension schema definition file 212 and calls the specified function. Note that the Bidi extension JS is an abbreviation of the Bidi extension JavaScript.

The applications 210 designate identification information of the target printer 250 with respect to a Bidi API in order to send the Bidi schema to the USB port monitor 207. This allows the USB port monitor 207 to advance processing by using the Bidi extension schema definition file 212 of the printer driver 205 of the printer 250 corresponding to the designated identification information. The USB port monitor 207 passes the Bidi schema received from the applications 210 to the Bidi extension JS 211 when the function of the Bidi extension JS 211 is called. At this time, the USB port monitor 207 also passes an object to the Bidi extension JS 211.

Based on the called function, the Bidi schema, and the object, the Bidi extension JS 211 feeds an instruction on processing of writing/reading out information in/to the designated printer 250 back to the USB port monitor 207. The USB port monitor 207 can comply with a vendor unique Bidi schema specification by asking the Bidi extension JS 211 to interpret the Bidi extension schema definition file 212. The USB port monitor 207 performs processing following the instruction fed back from the Bidi extension JS 211. More specifically, the USB port monitor 207 performs, following the instruction fed back from the Bidi extension JS 211, processing of writing/reading out the information in/from the printer 250 via the USB device interface 208 and the USB class driver 209. Note that the USB port monitor 207 also performs, following the instruction fed back from the Bidi extension JS 211, exclusive processing as one of characteristics of the present application.

FIG. 2 is one example of a new print system implemented on a new OS. Note that when the plurality of print jobs exist in the print queue, the new OS processes the print jobs sequentially, like a conventional OS. That is, FIFO (First In First Out) processing is performed. A new print system has some restrictions. For example, the v4 printer driver is not allowed to have a print setting screen. Accordingly, the print setting screen of the v4 printer driver is never called from the OS. Therefore, the OS provides the print setting screen.

When a user sets more detailed print setting information than the print setting screen provided by the OS, detailed setting is instructed on the print setting screen of the OS. Upon receiving this instruction, a print setting screen of a print setting application corresponding to the selected v4 printer driver is displayed. Note that the print setting screen of the print setting application can select more detailed print setting information than the print setting screen provided by the OS. For example, the print setting screen of the print setting application also accepts setting of the print setting information for a setting item that cannot be set on the print setting screen provided by the OS. The print setting application is downloaded to the information processing apparatus simultaneously with the download of the v4 printer driver. Then, the v4 printer driver and the print setting application are associated with each other by the identification information, allowing processing of displaying the above-described print setting screen. Note that the print setting application may operate as one of the applications 210.

As the other restriction, the language monitor is not allowed to operate in the new print system implemented on the new OS. That is, the OS does not call the print setting screen of the v4 printer driver, and the print application associated with the printer driver calls the print setting screen. In addition, the OS does not call the language monitor.

[Processing by Application]

Figure 3A:
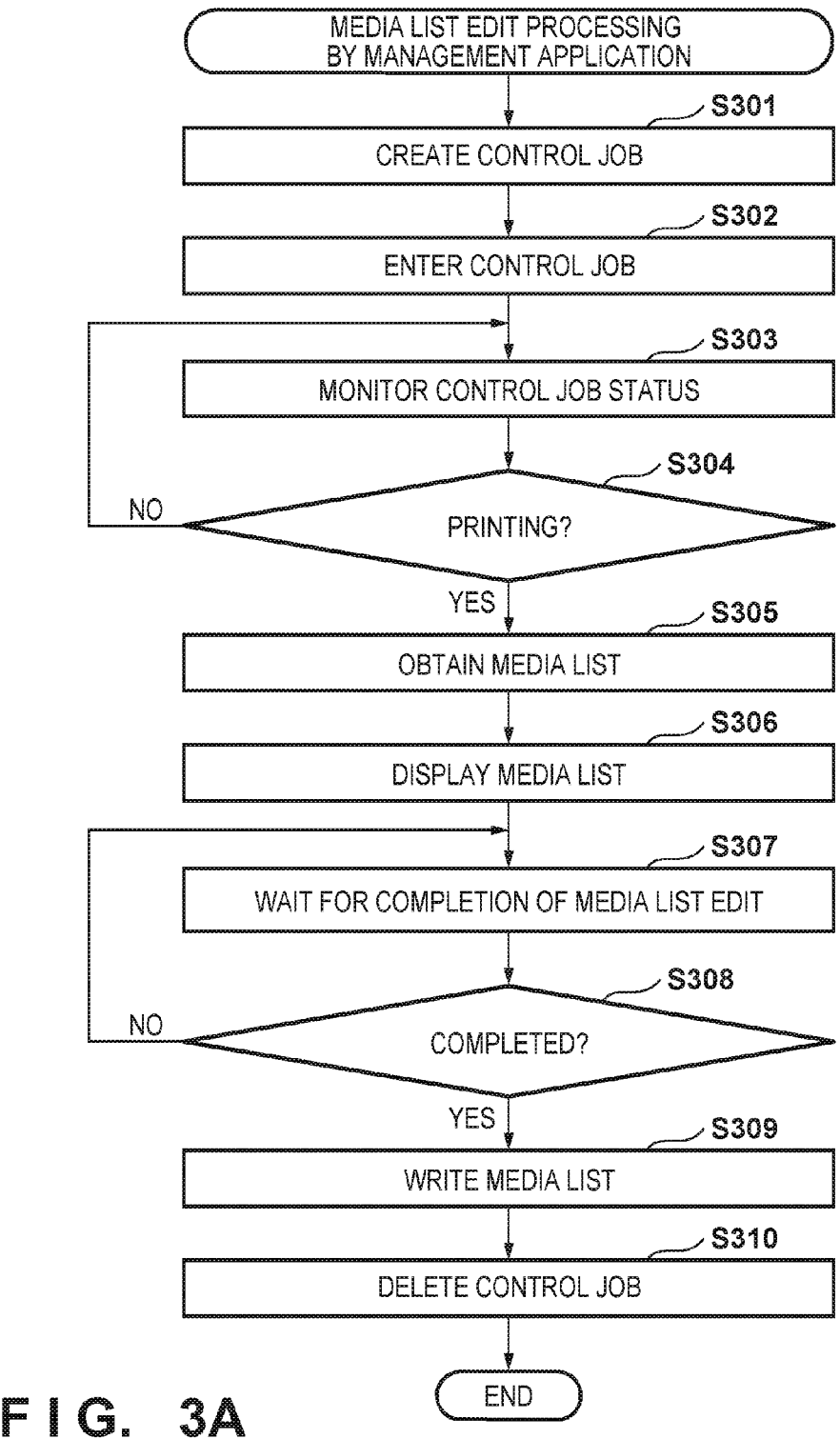
FIGS. 3A and 3B are flowcharts showing information obtainment processing by applications.

FIG. 3A is a flowchart showing media list edit processing by a management application. The management application is an application which corresponds to one of the applications 210 shown in FIG. 2 and manages print media information supported by the printer 250. Further, the management application is implemented by causing the CPU 103 of the information processing apparatus 100 to read out and execute the programs stored in the external storage device 106 or the like.

Note that in this embodiment, all applications installed on the information processing apparatus 100 create control jobs to be described later when communicating with the printer. As a result, the applications cannot communicate with the printer without creating the control jobs.

Processing of FIG. 3A is started by inputting a media list edit instruction (user instruction) in a management application UI. When media list edit processing is started, in step S301, the management application creates a communication occupying control job (to be referred to as a control job hereinafter) for the purpose of occupying communication with the printer 250. Note that in this embodiment, a job which requests print processing for the printer will be referred to as a print job in order to distinguish it from the control job. Further, the control job and the print job to be entered in the print queue 204 will collectively be referred to as jobs.

FIG. 9 shows an example of the arrangement of a GUI (Graphical User Interface) 900 of the print queue 204. Information 901 indicating that a job aims at occupying communication with the printer 250 and information 902 for the application that has created the job to uniquely identify that "the job is a job created by itself" are added to the control job as a purpose. In other words, the information 902 is information for the application to identify a generation source of the control job. For example, a method of adding these pieces of information to a job name and setting, as the job name, a character string obtained by combining "Control_" indicating that a job is a control job and a GUID (Globally Unique Identifier) for uniquely specifying a job is considered. A status 903 is information indicating job processing status. "Printing", "waiting for spool", or the like is given as the status 903.

In step S302, the management application enters the created control job in the spooler 203. If the preceding job exists in the print queue 204, the control job entered in step S302 is held in the print queue 204 until processing of the preceding job is completed. That is, a queue processing wait state is set, as described above.

In step S303, based on the information 901 for identifying whether the job is the aforementioned control job and the information 902 for uniquely specifying the job given to the job name, the management application specifies, as a monitoring target, the control job entered in the print queue 204 by itself. Then, the management application monitors the status of the specified control job to be monitored.

In step S304, the management application determines whether the status 903 of the control job entered by itself is "printing". If the status is "printing" (YES in step S304), the process proceeds to step S305. If the status is not "printing" (NO in step S304), the management application returns to step S303 and continues to monitor the status of the control job. Note that as for monitoring, the status may be monitored at a time interval defined in advance. Regardless of the type of job, the status of the control job entered by the management application never becomes "printing" if the preceding job exists in the print queue 204. It is thus determined No in step S304. On the other hand, if there is no preceding job, or processing of the preceding job is completed, it is determined Yes in step S304.

Note that the management application uses the USB port monitor 207 and the Bidi extension JS 211 to communicate with the printer 250. The other applications of the PC also use the control jobs to make similar determinations, making it possible to limit, to one, the application which communicates with the printer 250 by using the USB port monitor 207 and the Bidi extension JS 211. As a result, it is possible to prevent, for example, interrupts from other applications which are a problem assumed by the present application. Further, if a plurality of jobs exist in the print queue 204, the interruption of the subsequent job can be prevented, regardless of the type of job, while processing the control job because the job to be processed is only one at the head.

Note that a method such as a semaphore may be used as a method of excluding processing among a plurality of pieces of software which operate in different processes. It is impossible, however, to exclude processing by using such a method because the Bidi extension JS cannot perform inter-process communication.

In step S305, the management application performs media list obtainment processing during communication occupation implemented by processing the control job. More specifically, the management application obtains a media list from the printer 250 by performing the media list obtainment processing.

In step S306, the management application displays the media list obtained in step S305 on the display unit 107 of the information processing apparatus 100. The user refers to the displayed information and performs a media list edit operation.

In step S307, the management application waits for the user to finish editing the media list.

In step S308, the management application determines whether an instruction that the edit operation is completed is received from the user. If the instruction that the edit operation is completed is received from the user (YES in step S308), the process proceeds to step S309. If the instruction that the edit operation is completed is not received, the process returns to step S307 and waits until the completion.

In step S309, the management application performs processing of writing the edited media list in the printer 250.

In step S310, based on the information 901 for identifying the control job and the information 902 for uniquely specifying the job, the management application specifies and deletes the control job on the print queue 204 entered in step S302 by itself. Then, this processing sequence ends.

Note that detailed processing will be described later with reference to FIG. 7. However, processing in step S310 cancels communication occupation of the management application with respect to the USB port monitor 207 and the Bidi extension JS 211.

Figure 3B:
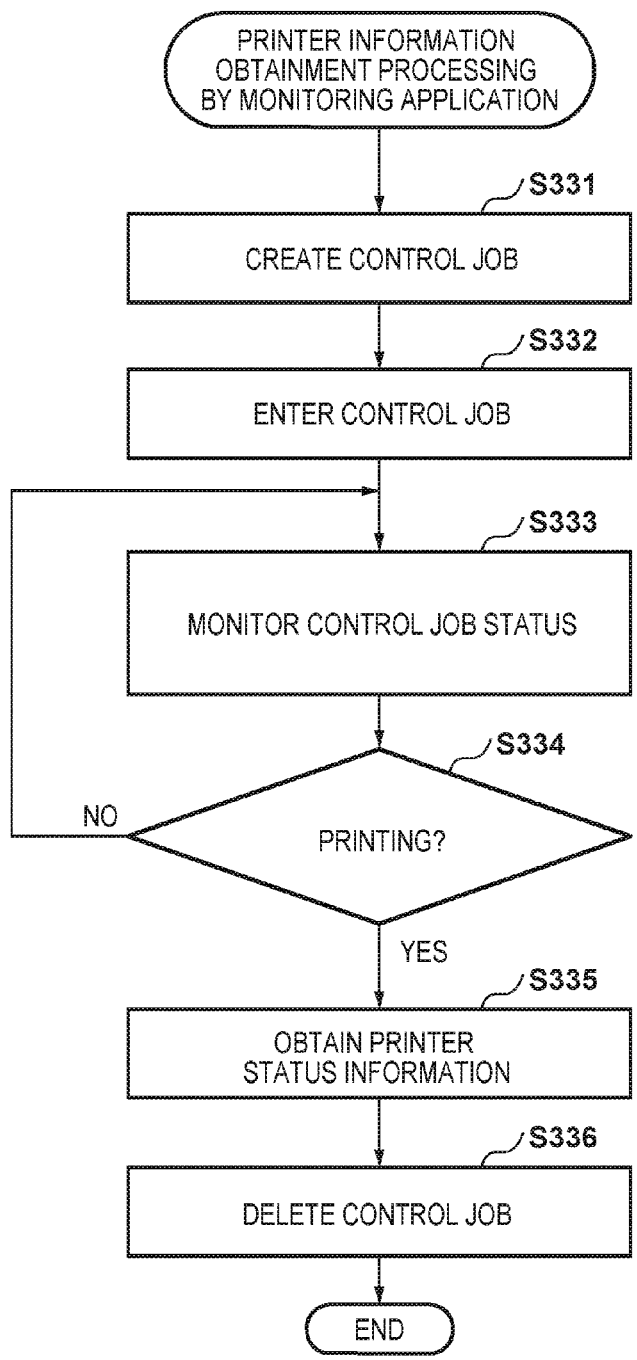

FIG. 3B is a flowchart showing processing in which a monitoring application obtains status information of the printer 250. The monitoring application corresponds to one of the applications 210 shown in FIG. 2, regularly obtains the status information of the printer 250, and displays its status on the display unit 107 of the information processing apparatus 100. The monitoring application is implemented by causing the CPU 103 of the information processing apparatus 100 to read out the programs stored in the external storage device 106 or the like.

When processing of obtaining the information of the printer 250 is started, the monitoring application creates a control job in step S331. As in FIG. 3A, this control job is used to prevent process interrupts by the other applications and the printer driver which communicate with the printer 250 by using the USB port monitor 207 and the Bidi extension JS 211.

In step S332, the monitoring application enters the created control job in the spooler 203. If the preceding job exists in the print queue 204, the control job entered in step S332 is held in the print queue 204 until processing of the preceding job is completed. That is, the queue processing wait state is set as in FIG. 3A.

In step S333, based on the information 901 for identifying the control job and the information 902 for uniquely specifying the job given to the job name, the monitoring application monitors the status of the control job on the spooler 203.

In step S334, the monitoring application determines whether the status of the control job is "printing". If the status of the control job is not "printing" (NO in step S334), the monitoring application returns to step S333 and continues to monitor the status of the control job. On the other hand, if the status of the control job is "printing" (YES in step S334), the process proceeds to step S335.

In step S335, the monitoring application performs processing of obtaining the status information of the printer 250. At this time, the monitoring application occupies communication with the printer 250. After obtainment processing is completed, the process proceeds to processing in step S336.

In step S336, the monitoring application deletes the control job entered in step S332 by itself. Then, this processing sequence ends.

Note that in this embodiment, a description is continued using the management application and the monitoring application. However, the other applications such as the aforementioned print setting application that needs communication with the printer may be used.

[Bidi Extension Schema Definition File]

The Bidi extension schema definition file 212 which describes the vendor unique schema specification will now be described in detail with reference to FIG. 5. As shown in FIG. 5, the Bidi extension schema definition file 212 is described in the XML. A state will be described in which schemas called SendPrintData, SetData, and GetData are defined as Valuename in the Bidi extension schema definition file 212 shown in FIG. 5.

The SendPrintData schema is defined as a Value type being a BIDI_STRING type, accessType being "Set", and a schema path being "¥¥Printer¥Extension: SendPrintData". SendPrintData is a schema utilized when the print data is written in the printer 250. This SendPrintData schema is designated as the Bidi interface for print processing. With the SendPrintData schema, it is possible to write, in the printer 250, the print data which is generated based on the print job entered in the spooler 203.

The SetData schema is defined as the Value type being the BIDI_STRING type, accessType being "Set", and the schema path being "¥¥Printer¥Extension: SetData". SetData is a schema utilized when request information is written in the printer 250 in media list obtainment processing (step S305), media list write processing (step S309), and processing of obtaining the status information of the printer 250 (step S335). This SetData schema is designated as the Bidi interface for above-described processing. With the SetData schema, it is possible to write, in the printer 250, a media list request command (FIG. 6A), a request command for the status information of the printer 250 (FIG. 6B), and a media information setting command (FIG. 6C) as shown in FIGS. 6A to 6D.

The GetData schema is defined as the Value type being the BIDI_STRING type, accessType being "Get", and the schema path being "¥¥Printer¥Extension: GetData". GetData is a schema utilized when response information is obtained from the printer 250 in media list obtainment processing (step S305), media list write processing (step S309), and status information obtainment processing (step S335). This GetData schema is designated as the Bidi interface for above-described processing. After the media list request command of FIG. 6A is written in the printer 250 in the SetData schema, it is possible to obtain, with the GetData schema, media list response information as shown in FIG. 6D from the printer 250.

Only the schemas needed to explain this embodiment are described here. As a matter of course, however, a schema for obtaining capability information of the printer or the like needs to be defined in accordance with another function. That is, without being limited to the above-described schemas, other schemas may be defined.

[Processing by Bidi Extension JS]

Figure 4A:
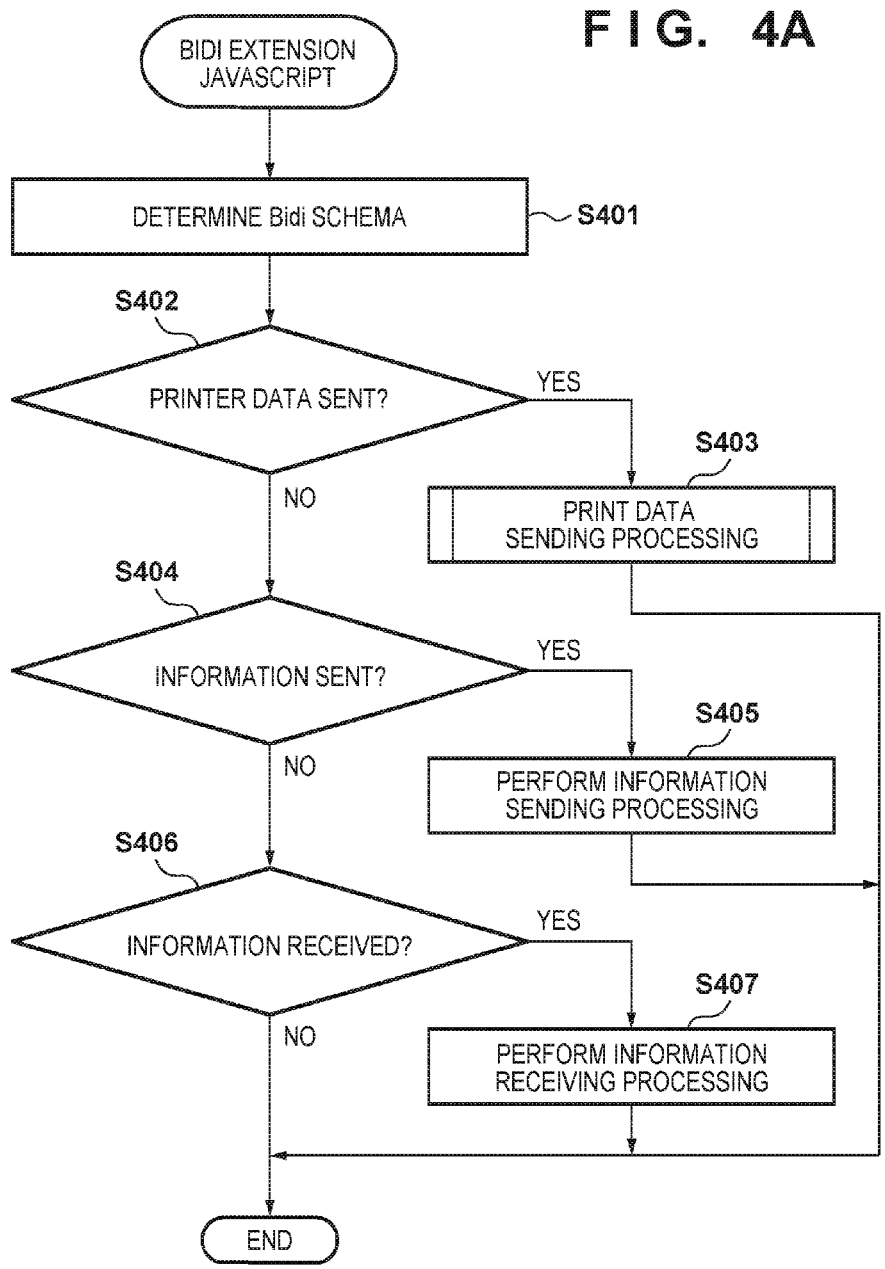
FIGS. 4A and 4B are flowcharts showing processing by a Bidi extension JS.

FIG. 4A is a flowchart showing schema determination processing by the Bidi extension JS 211 called by the USB port monitor 207 that has received the schema by the Bidi interface. The OS cannot understand the contents of the Bidi schema received from the applications 210 (for example, the management application and the monitoring application described above). Therefore, the USB port monitor 207 passes, to the Bidi extension JS 211, both the object and the Bidi schema received from the applications 210 when calling the function of the Bidi extension JS 211. Processing of FIG. 4A is performed by this processing.

When schema determination processing is started, the Bidi extension JS 211 determines the schema name (Value name) of the received schema in step S401.

Figure 4B:
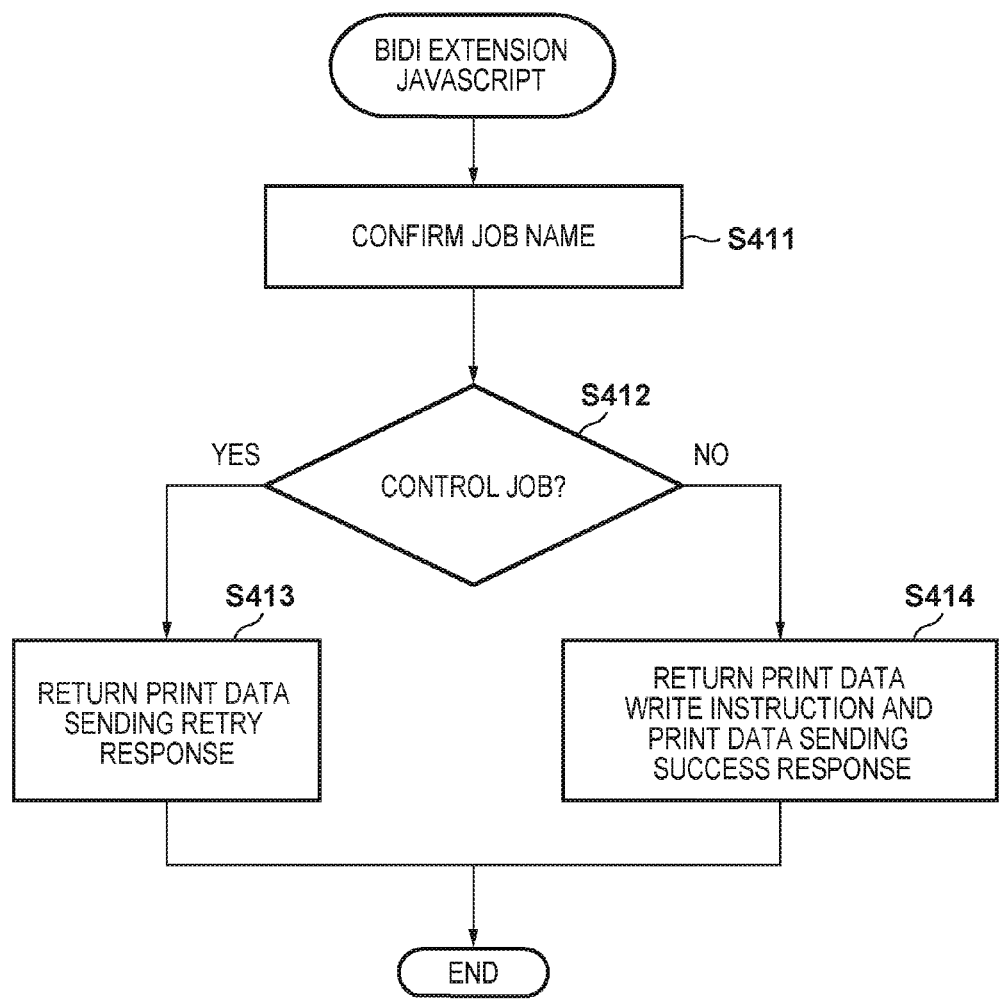

In step S402, the Bidi extension JS 211 determines, based on the determination in step S401, whether the schema name is print data sending (SendPrintData). If the schema name is print data sending (YES in step S402), the Bidi extension JS 211 performs print data sending processing in step S403. Note that a detailed description of step S403 is shown in FIG. 4B.

In step S404, the Bidi extension JS 211 determines, based on the determination in step S401, whether the schema name is information sending (SetData). If the schema name is information sending (YES in step S404), the Bidi extension JS 211 performs information sending processing in step S405.

In step S406, the Bidi extension JS 211 determines, based on the determination in step S401, whether the schema name is information receiving (GetData). If the schema name is information receiving (Yes in step S406), the Bidi extension JS 211 performs information receiving processing in step S407.

This processing sequence ends after print data sending processing (step S403), information sending processing (step S405), and information receiving processing (step S407) are completed, or the schema names are none of the above.

FIG. 4B is a flowchart showing a detail of print data sending processing (step S403 of FIG. 4A) by the Bidi extension JS 211. Note that it is assumed here that based on the example described above with reference to FIG. 9, a mark (information 901) indicating the control job is given to the job name.

When print data sending processing is started, in step S411, the Bidi extension JS 211 confirms the name of a print job to be processed.

In step S412, the Bidi extension JS 211 determines whether the job to be processed is a control job. If it is the control job (YES in step S412), the process proceeds to step S413. If it is not the control job (NO in step S412), the process proceeds to step S414.

In step S413, the Bidi extension JS 211 returns, to the USB port monitor 207, a print data sending retry response indicating that print data sending processing needs a retry. The status is maintained as "printing" until the control job is deleted from the print queue by causing the Bidi extension JS 211 to perform processing in step S413. Then, this processing sequence ends.

In step S414, the Bidi extension JS 211 returns, to the USB port monitor 207, a print data write instruction and a print data sending success response. Then, this processing sequence ends. While the print data sending retry response is returned, the job to be processed remains in the print queue 204, and processing of FIG. 4A is performed.

The control job remains on the print queue 204 until the application that has entered the control job deletes that control job by processing of FIG. 4A. Therefore, the succeeding job is not processed. This utilizes a conventional OS mechanism in which if the plurality of jobs exist in the print queue 204, the jobs are processed sequentially. That is, during that time, the Bidi extension JS 211 is occupied by the applications 210 that have sent the Bidi schema and has restricted use by the other applications. This arrangement allows the present invention to solve the above-described problem.

[Processing Sequence]

FIG. 7 is a sequence chart showing an overall processing sequence of various applications, the OS, and a printer. The way the other application and a spooler behave while an application A occupies a USB will be described with reference to FIG. 7.

An application A 700 is, for example, the management application (one of the applications 210) described with reference to FIG. 3A. The application A 700 creates a control job A aimed at occupying communication with a printer 760 and enters it in the print queue of a spooler 720 (701 and step S302).

The spooler 720 receives the control job A (721). At this time, other jobs are not entered in the print queue of the spooler 720, and thus the status of the control job A becomes "printing". Further, the spooler 720 instructs a USB port monitor 730 to write print data (722).

The USB port monitor 730 instructed to write the print data specifies the function of a Bidi extension JS 750 with reference to the Bidi extension schema definition file and calls the specified function (731).

The Bidi extension JS 750 identifies that an in-process job is a control job and returns a print data sending retry response to the USB port monitor 730 (751). That is, when a processing request is made, the Bidi extension JS 750 determines whether the in-process job is the control job, and if determining that the in-process job is the control job, repeats the retry response such that its status is continued as "printing", as shown in FIG. 4B. While this print data sending retry response is returned, the status of the control job A on the print queue remains as "printing", and processing of 722, 731, and 751 described above is repeated. Even if the other application or a printer driver enters a control job or a print job in the print queue during that time, such a subsequent job is not processed. That is, only an application that has issued a job at the head of the print queue is allowed to communicate with the printer. As a result, in the example of FIG. 7, the application A 700 can occupy communication with the printer 760.

The application A 700 monitors the status of the control job A on the print queue (702). This monitoring may be done regularly at a time interval defined in advance. Then, once the status becomes "printing", the application A 700 utilizes the Bidi schema to instruct the USB port monitor 730 to perform Write/Read processing (703).

The USB port monitor 730 instructed to perform Write/Read processing specifies the function of the Bidi extension JS 750 with reference to the Bidi extension schema definition file and calls the specified function (732).

The Bidi extension JS 750 instructs the USB port monitor 730 to perform processing according to a GetData/ReadData schema (752).

Upon receiving the instruction from the Bidi extension JS 750, the USB port monitor 730 requests Write/Read processing to the printer 760 (733).

Upon receiving the request of Write/Read processing from the USB port monitor 730 (733), the printer 760 responds by returning data for the request (761). If the request from the USB port monitor 730 is a media list obtainment request shown in FIG. 6A, the data which is responded by the printer 760 is the media list response information shown in FIG. 6D. The data to which the printer 760 responds is passed to the application A 700 via the USB port monitor 730 and the Bidi extension JS 750. Note that the application A 700 is occupied in utilizing the USB port, making it possible to repeat Write/Read processing (703 and steps S305 and S335) a plurality of times.

Upon finishing utilizing the Bidi interface, the application A 700 deletes the control job A entered in the print queue of the spooler 720 by itself (704). A period of USB port occupation 723 by the application A 700 ends by deleting the control job A on the print queue.

Subsequently, processing will be described in which while the application A 700 performs communication processing with the printer 760, another application B 710 attempts communication with the printer 760. The application B 710 is, for example, the monitoring application (one of the applications 210) described with reference to FIG. 3B. The application B 710 creates a control job B aimed at occupying communication with a printer 760 and enters it in the print queue of the spooler 720 (711).

The spooler 720 receives the control job B (724). Note that the spooler 720 processes the control job A entered by the application A 700 earlier, and thus the status of the control job B at this time becomes "waiting for spool". The application B 710 monitors the status of the control job B (712). Note that the status of the control job B never becomes "printing" until processing of the control job A is completed, and thus the application B 710 continues to monitor the status. Once the application A 700 deletes the control job A (704), the spooler 720 starts processing the control job B. That is, the status of the control job B becomes "printing". The spooler 720 instructs the USB port monitor 730 to write print data with respect to the control job B (725).

The USB port monitor 730 instructed to write the print data specifies the function of the Bidi extension JS 750 with reference to the Bidi extension schema definition file and calls the specified function (734).

The Bidi extension JS 750 identifies that an in-process job is a control job and returns a print data sending retry response to the USB port monitor 730 (753). While this print data sending retry response is returned, the status of the control job B on the print queue of the spooler 720 remains as "printing", and processing of 725, 734, and 753 described above is repeated. Even if the other application or the printer driver enters a control job or a print job in the print queue during that time, such a subsequent job is not processed. As a result, the application B 710 can occupy communication with the printer 760.

The application B 710 monitors the status of the control job B on the print queue (713). Then, once the status of the control job B becomes "printing", the application B 710 utilizes the Bidi schema to instruct the USB port monitor 730 to perform Write/Read processing (714).

The USB port monitor 730 instructed to perform Write/Read processing specifies the function of the Bidi extension JS 750 with reference to the Bidi extension schema definition file and calls the specified function (735).

The Bidi extension JS 750 instructs the USB port monitor 730 to perform processing according to the GetData/ReadData schema (754).

Upon receiving the instruction from the Bidi extension JS 750, the USB port monitor 730 requests Write/Read processing to the printer 760 (736).

Upon receiving the request of Write/Read processing from the USB port monitor 730 (736), the printer 760 responds by returning data for the request (762). If the request from the USB port monitor 730 is an obtainment request of the status information of the printer 250 shown in FIG. 6B, the responded data is information regarding the status of the printer 250. The data which is responded by the printer 760 is passed to the application B 710 via the USB port monitor 730 and the Bidi extension JS 750. Note that the application B 710 is occupied in utilizing the USB port, making it possible to repeat Write/Read processing (714 and steps S305 and S335) a plurality of times.

Upon finishing utilizing the Bidi interface, the application B 710 deletes the control job B entered in the print queue of the spooler 720 by itself (715). A period of USB port occupation 726 by the application B 710 ends by deleting the control job B on the print queue.

As described above, each application can restrict processing for an interruption from the other application by creating the control job aimed at occupying communication with the printer and entering it in the print queue of the spooler. Processing of the control job B entered in the print queue of the spooler by the application B 710 is started by deletion processing of the control job A (704 of FIG. 7). Exclusive processing of the plurality of applications and the printer has been described here by taking, as examples, applications serving as pieces of software other than the printer driver. However, the OS mechanism in which the jobs on the print queue of the spooler are processed sequentially is utilized, also allowing exclusion with a print job entered in the print queue by the printer driver.

Note that a case is also considered in which processing ends without the application A 700 performing deletion processing of the control job A (704). To cope with such a case, for example, information indicating a job lifetime is added to the job name of each control job entered in the print queue by a corresponding one of the applications. Then, the Bidi extension JS 750 may determine, from time at which the in-process control job is entered in the print queue, information on the lifetime added to each job name, and current time, whether to return the print data sending retry response to the USB port monitor 730. As a result of the determination, if the job still survives exceeding the lifetime added to the job name, a target control job is deleted from the print queue by returning a print data sending success response to the USB port monitor 730.

Note that this application describes the printer as an apparatus capable of communicating with the information processing apparatus. However, another peripheral device such as a digital camera or a scanner may be described.

Second Embodiment

In the first embodiment, a mode has been described in which the application prevents interruption from the other application by utilizing the control job and utilizes the Bidi interface to request Write/Read processing during that time. In this embodiment, a mode will be described in which an application prevents an interruption from another application by utilizing a control job and requests Write/Read processing directly for a USB device interface 208 during that time.

Figure 8:
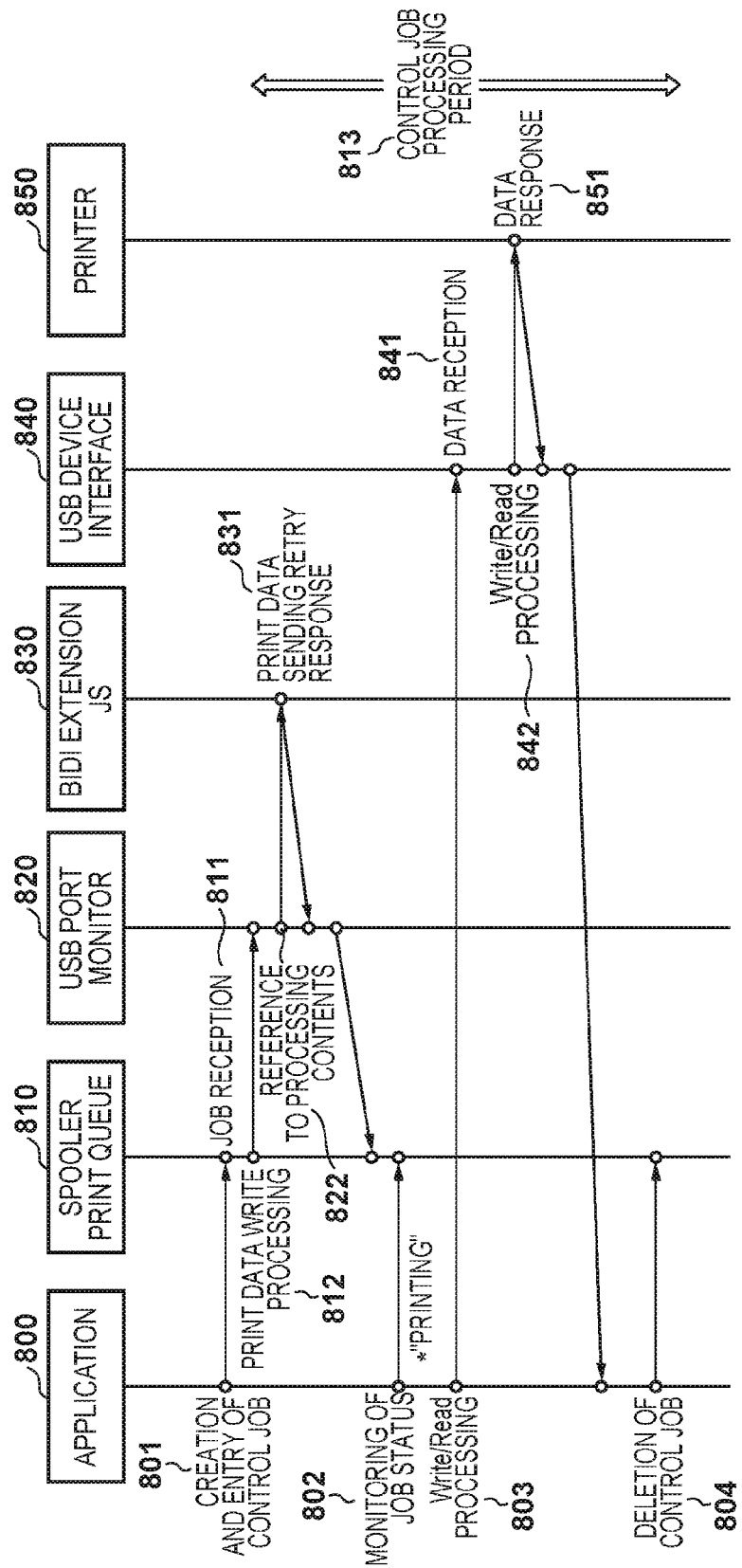
FIG. 8 is a sequence chart showing an overall processing sequence according to the second embodiment.

FIG. 8 is a sequence chart showing an overall sequence of an application, an OS, and a printer according to this embodiment. A sequence will be described, with reference to FIG. 8, in which the application utilizes a USB device interface directly while occupying a USB. An application 800 is, for example, the management application (one of the applications 210) described with reference to FIG. 3A.

The application 800 creates a control job aimed at occupying communication with a printer 850 and enters it in the print queue of a spooler 810 (801). The spooler 810 receives the control job (811). At this time, other jobs are not entered in the print queue of the spooler 810, and thus the status of the control job becomes "printing". The spooler 810 instructs a USB port monitor 820 to write print data (812). The USB port monitor 820 instructed to write the print data specifies the function of a Bidi extension JS 830 with reference to a Bidi extension schema definition file and calls the specified function (822).

The Bidi extension JS 830 identifies that an in-process job is a control job and returns a print data sending retry response to the USB port monitor 820 (831). While this print data sending retry response is returned, the status of the control job on the print queue of the spooler 810 remains as "printing", and processing of 812, 822, and 831 described above is repeated. Even if the other application or a printer driver enters a print job in the print queue of the spooler 810 during that time, such a subsequent print job is not processed. This allows the application 800 to occupy communication with the printer 850.

The application 800 monitors the status of the control job on the print queue of the spooler 810 (802). This monitoring may be done regularly at a time interval defined in advance. Then, once the status becomes "printing", the application 800 requests Write/Read processing (803). Write/Read processing here is a processing of opening a USB device interface 840 and writing/reading data directly.

Upon receiving a processing request from the application 800 (841), the USB device interface 840 requests Write/Read processing for the printer 850 (842).

Upon receiving the request of Write/Read processing from the USB device interface 840 (842), the printer 850 responds by returning data for the request (851). If the request from the USB device interface 840 is a media list obtainment request shown in FIG. 6A, the data to which the printer 850 responds is the media list response information shown in FIG. 6D. The data to which the printer 850 responds is passed to the application 800 via the USB device interface 840. Note that applications 210 are occupied in utilizing a USB port, making it possible to repeat Write/Read processing a plurality of times.

Upon finishing utilizing a Bidi interface, the application 800 deletes the control job entered in the print queue of the spooler 810 by itself (804). A period of USB port occupation 813 by the application 800 ends by deleting the control job on the print queue.

As described above, the application 800 can restrict processing for an interruption from the other application by creating the control job aimed at occupying communication with the printer 850 and entering it in the print queue. Processing of a succeeding print job on the print queue is started by control job deletion processing.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-031462, filed Feb. 22, 2016, which is hereby incorporated by reference herein in its entirety.

What is claimed is:

1. An information processing apparatus capable of operating an application, the apparatus comprising:
a generation unit configured to generate a control job for occupying communication with a peripheral device, wherein the control job is stored in a job queue, and is different from a print job that is stored in the job queue due to require print processing; and
a deletion unit configured to delete the control job stored in the job queue,
wherein, if a status of the control job stored in the job queue is processing, communication with the peripheral device via a communication unit is occupied by an application that has created the control job, and, after communication for the application is completed, the deletion unit deletes the control job stored in the job queue,
wherein the generation unit and the deletion unit are implemented by a processor of the information processing apparatus.

2. The apparatus according to claim 1, further comprising a processing unit configured to process jobs stored in the job queue,
wherein the processing unit determines whether the job to be processed out of the jobs stored in the job queue is the control job, and if the job is the control job, controls the status to be processing until the deletion unit deletes the control job.

3. The apparatus according to claim 2, wherein a Bidi extension JavaScript included in a v4 printer driver executes the processing unit.

4. The apparatus according to claim 1, wherein information indicating that a job is a control job and information for uniquely identifying the application that has generated the control job are added to the control job.

5. The apparatus according to claim 4, wherein the pieces of added information are added as a job name of the control job.

6. The apparatus according to claim 5, further comprising a monitoring unit configured to monitor the status of the control job stored in the job queue, wherein, based on the job name of the control job, the monitoring unit specifies the control job generated by the application as a monitoring target.

7. The apparatus according to claim 1, wherein, if a status of the control job stored in the job queue is processing, information about a sheet held by the peripheral device is obtained via the occupied communication by the application.

8. The apparatus according to claim 7, further comprising an edit unit configured to edit the obtained information about the sheet, wherein, if the edited information about the sheet is sent via the occupied communication from the application, the control job is deleted from the job queue, and wherein the edit unit is implemented by the processor of the information processing apparatus.

9. The apparatus according to claim 1, wherein, if a status of the control job stored in the job queue is processing, information of status of the peripheral device is obtained via the occupied communication by the application.

10. The apparatus according to claim 1, further comprising a determination unit configured to determine whether a processing target job is the control job, wherein, if it is determined that the processing target job is the control job, a retry response is notified to a port monitor, wherein, if it is determined that the processing target is not the control job, a print instruction and a success response are notified to the port monitor, and wherein the determination unit is implemented by the processor of the information processing apparatus.

11. A method of controlling an information processing apparatus capable of operating an application, the information processing apparatus having a memory that stores instructions and a processor that executes the instructions to perform the method, the method comprising:

generating a control job for occupying communication with a peripheral device, wherein the control job is stored in a job queue, and is different from a print job that is stored in the job queue due to require print processing; and deleting the control job stored in the job queue, wherein, if a status of the control job stored in the job queue is processing, communication with the peripheral device via a communication unit is occupied by the application that has created the control job, and, after communication for the application is completed, the control job stored in the job queue is deleted.

12. The method according to claim 11, further comprising determining whether a job to be processed out of jobs stored in the job queue is the control job, and, if it is determined that the job to be processed is the control job, control is performed such that the status of the job to be processed becomes processing until the control job is deleted.

13. The method according to claim 12, wherein, if it is determined that the job to be processed is the control job, a Bidi extension JavaScript included in a v4 printer driver controls the status of the job to be processed to be processing until the control job is deleted.

14. The method according to claim 11, wherein information indicating that a job is a control job and information for uniquely identifying the application that has generated the control job are added to the control job.

15. The method according to claim 14, wherein the pieces of added information are added as a job name of the control job.

16. The method according to claim 11, wherein, if a status of the control job stored in the job queue is processing, information about a sheet held by the peripheral device is obtained via the occupied communication by the application.

17. The method according to claim 16, further comprising editing the obtained information about the sheet, wherein, if the edited information about the sheet is sent via the occupied communication from the application, the control job is deleted from the job queue.

18. The method according to claim 11, wherein, if a status of the control job stored in the job queue is processing, information of status of the peripheral device is obtained via the occupied communication by the application.

19. The method according to claim 11, further comprising determining whether a processing target job is the control job, wherein, if it is determined that the processing target job is the control job, a retry response is notified to a port monitor, and wherein, if it is determined that the processing target is not the control job, a print instruction and a success response are notified to the port monitor.

20. A non-transitory computer-readable storage medium storing a program that causes a computer to function as:

a generation unit configured to generate a control job for occupying communication with a peripheral device, wherein the control job is stored in a job queue, and is different from a print job that is stored in the job queue due to require print processing; and a deletion unit configured to delete the control job stored in the job queue, wherein, if a status of the control job stored in the job queue is processing, communication with the peripheral device via a communication unit is occupied by an application that has created the control job, and, after communication for the program is completed, the deletion unit deletes the control job stored in the job queue.

* * * * *